United States Patent [19]
Csipkes et al.

[11] Patent Number: 6,167,401
[45] Date of Patent: *Dec. 26, 2000

[54] MANUFACTURING CONTROL NETWORK HAVING A RELATIONAL DATABASE

[75] Inventors: Andrei Csipkes, Savage; Mike J. Ransford, Arnold; Dave A. Schwarten, Ellicott City, all of Md.

[73] Assignee: CIENA Corporation, Linthicum, Md.

[*] Notice: This patent issued on a continued prosecution application filed under 37 CFR 1.53(d), and is subject to the twenty year patent term provisions of 35 U.S.C. 154(a)(2).

[21] Appl. No.: 09/020,512

[22] Filed: Feb. 9, 1998

[51] Int. Cl.$^7$ .................................................. G06F 17/30
[52] U.S. Cl. ............................. 707/10; 707/101; 707/104
[58] Field of Search ............................... 364/468.03, 489; 707/10, 102, 517, 101, 104; 706/48; 702/84; 324/750

[56] References Cited

U.S. PATENT DOCUMENTS

| | | | |
|---|---|---|---|
| 5,418,888 | 5/1995 | Alden | 706/48 |
| 5,443,534 | 8/1995 | Vinciarelli et al. | 29/593 |
| 5,448,727 | 9/1995 | Annevelink | 707/101 |
| 5,610,828 | 3/1997 | Kodosky et al. | 364/489 |
| 5,714,888 | 2/1998 | Naujoks | 324/750 |
| 5,754,845 | 5/1998 | White | 707/10 |
| 5,822,206 | 10/1998 | Sebastian et al. | 364/468.03 |
| 5,884,315 | 3/1999 | Dunn | 707/102 |
| 5,903,902 | 5/1999 | Orr et al. | 707/517 |
| 5,918,191 | 6/1999 | Patel | 702/84 |

OTHER PUBLICATIONS

Hawley et al., "Paperless assembly using touchscreen based graphics", IEEE, 1991, pp. 231–234.

Primary Examiner—Wayne Amsbury
Assistant Examiner—Thuy Pardo
Attorney, Agent, or Firm—Daniel N. Daisak; David L. Soltz; Michael R. Cammarata

[57] ABSTRACT

A communications system includes a plurality of work stations and a relational database operatively linked therewith. Each of the workstations includes a computer terminal having a display and at least one input device, test apparatus operatively coupled to said computer terminal, and an assembly application program which generates a first display of an assembly procedure to be followed by an assembler on said display of said computer terminal and a second display screen for display of test results obtained by said test apparatus on said display of said computer terminal. The relational database stores data which is independent of the assembly program and which indicative of the assembly procedure used by the assembly application program. A data structure of the relational database includes an tracking table and an action table, in which the tracking table being used to link to data contained in the action table. The tracking table identifies a type of product, a serial number of the product, and process steps associated with the product, and the action table identifies work instructions, test files and automated manufacturing files.

22 Claims, 15 Drawing Sheets

MANUFACTURING TECHNOLOGY

PROCESS: REMOD-T3-TEST MENU

COMMENTS

CLOSE

| Field | Value | | Field | Value |
|---|---|---|---|---|
| SerialNumber | M0041998 | | MINIMA | 192.5984 |
| OPERATOR | 9999 | | MAXIMA | 192.6008 |
| FREQ | 0 | | InitialGratingTemp | 70.6 |
| POWERSET | 300 | | FinalGratingTemp | 69.1 |
| POWEROUT | 301.82 | | DeltaDriftFreq | 0.0024 P |
| SATBERT | 0 P | | Bertm12 | 0 |
| MINBERT | 0 P | | WaveLength | 192.5996 P |
| Jitter@-7 | 54.6 P | | | |
| EyeWidth@-7 | 350.9 P | | | |
| RiseTime@-7 | 114.3 P | | | |
| ExtinctionRatio@-7 | 17.29 P | | | |
| Async | 0 P | | | |
| Dither | 0 P | | | |
| FactoryData | YES P | | | |
| CenterFreq | 0 P | | | |

FIG.5(c)

SERIAL NUMBER INFORMATION
MANUFACTURING TECHNOLOGY

MODULE: REMOD

OPERATION:
- PATCHCORD ASSEMBLY
- RF ASSEMBLY
- RF TESTING
- T2-TEST MENU
- T3-TEST MENU

STATION I.D:
OPERATOR I.D: 9999

| MODULE PN | 130-0122-905 | Rev P | GRATING PN | 265-2600-R02-B |
| MODULE SN | M0041998 | | GRATING SN | 70825SR |
| BOARD PN | 130-0101-405 | Rev T | | |
| BOARD SN | B1001206 | | | |
| LASER PN | 214-2600-141 | Rev B | | |
| LASER SN | ER6268 | | | |
| MODULATOR PN | 223-0002-210 | Rev A | | |
| MODULATOR SN | 53254E | | | |
| CASSETTE PN | 130-0122-505 | Rev C | | |
| CASSETTE SN | C0030834 | | | |

[GET DATA] [CLEAR FIELDS] [TRAINING OFF] [CLOSE/SAVE] [CANCEL]

FIG.8

MANUFACTURING CONTROL NETWORK HAVING A RELATIONAL DATABASE

CROSS REFERENCE TO RELATED APPLICATIONS

This application is a continuation-in-part of the U.S patent application entitled MANUFACTURING CONTROL STATION, filed Jan. 13, 1998, Ser. No. 09/006,443, now pending, the entirety of which is incorporated herein by reference for all purposes.

BACKGROUND OF THE INVENTION

1. Field of the Invention

The present invention generally relates to a manufacturing network, and in particular, to a global communications network of a manufacturing facility in which multiple assembly stations are under control of database driven network and in which instructional, manufacturing and test functions are integrated into an interactive system for use by a parts assembler.

2. Description of the Related Art

Notwithstanding the substantive progress made in recent years in automated manufacturing techniques, the manual assembly of component parts is still predominant in certain industries. Exemplary of this is the assembly of optical components into optical devices such as optical amplifiers. The typical such plant or factory, in which one or more assemblers is assigned the task of manually assembling one or more component parts, suffers numerous drawbacks.

For example, the assembler's station is usually accompanied by several bulky instruction manuals, such as three-ring binders laid open on the surface of the work station. These manuals are often awkward to handle and intrusive in the work space. Also, time is expended in turning pages as work progresses, and updates require the cumbersome replacement of pages of each manual at each station.

In addition, in cases where the assembler's duties include test and measurement functions, the conventional workstation must rely heavily on the attentiveness and precision of the assembler to ensure accurate results. The assembler is instructed to follow exactly the test and measurement routines specified in the manuals, and to accurately record results. However, in most cases the assembler will test numerous devices which fall well within specifications. This inevitably leads to a state of complacency on the part of the assembler, who comes to expect positive test results, and substantially increases the possibility of the assembler reading false-positives, i.e., testing a "bad" component or sub-assembly as "good". This situation ultimately results in decreased device yields.

This problem of decreased yields is further compounded in the case of updates in assembly or test routines. The assembler, due to repetition over a long period of time, often becomes accustomed to carrying out the certain steps in a given process. In fact, one can expect that the assembler will rely almost entirely on memory, eventually getting to the point where there are little or no references made to the instruction manuals. This makes it difficult to ensure the procedural updates are correctly being followed by the assembler, and in fact, reduces the probability of actual compliance with the new assembly routine. Again, the result is a reduction in device yields.

SUMMARY OF THE INVENTION

It is an object of the present invention to provide a manufacturing control network which overcomes many of the drawbacks of the conventional manufacturing facility, and in particular, to provide a manufacturing facility in which multiple assembly stations are under control of common database driven network so as to provide multiple workstations in which instructional, manufacturing, and test and measurement functions are integrated into an interactive system for use by a parts assembler.

According to one aspect of the invention, a communications system includes a plurality of work stations and a relational database operatively linked therewith. Each of the workstations includes a computer terminal having a display and at least one input device, test apparatus operatively coupled to said computer terminal, and an assembly application program which generates a first display of an assembly procedure to be followed by an assembler on said display of said computer terminal and a second display screen for display of test results obtained by said test apparatus on said display of said computer terminal. The relational database stores data which is independent of the assembly program and which indicative of the assembly procedure used by the assembly application program. A data structure of the relational database includes an tracking table and an action table, in which the tracking table being used to link to data contained in the action table. The tracking table identifies a type of product, a serial number of the product, and process steps associated with the product, and the action table identifies work instructions, test files and automated manufacturing files.

BRIEF DESCRIPTION OF THE DRAWINGS

The above and other objects and advantages of the present invention will become readily understood from the description that follows with reference to the accompanying drawings, in which:

FIGS. 5(a) through 5(c) are examples of test results screens;

FIG. 8 is an example of a process information screen;

DETAILED DESCRIPTION OF THE PREFERRED EMBODIMENTS

Figure 1:
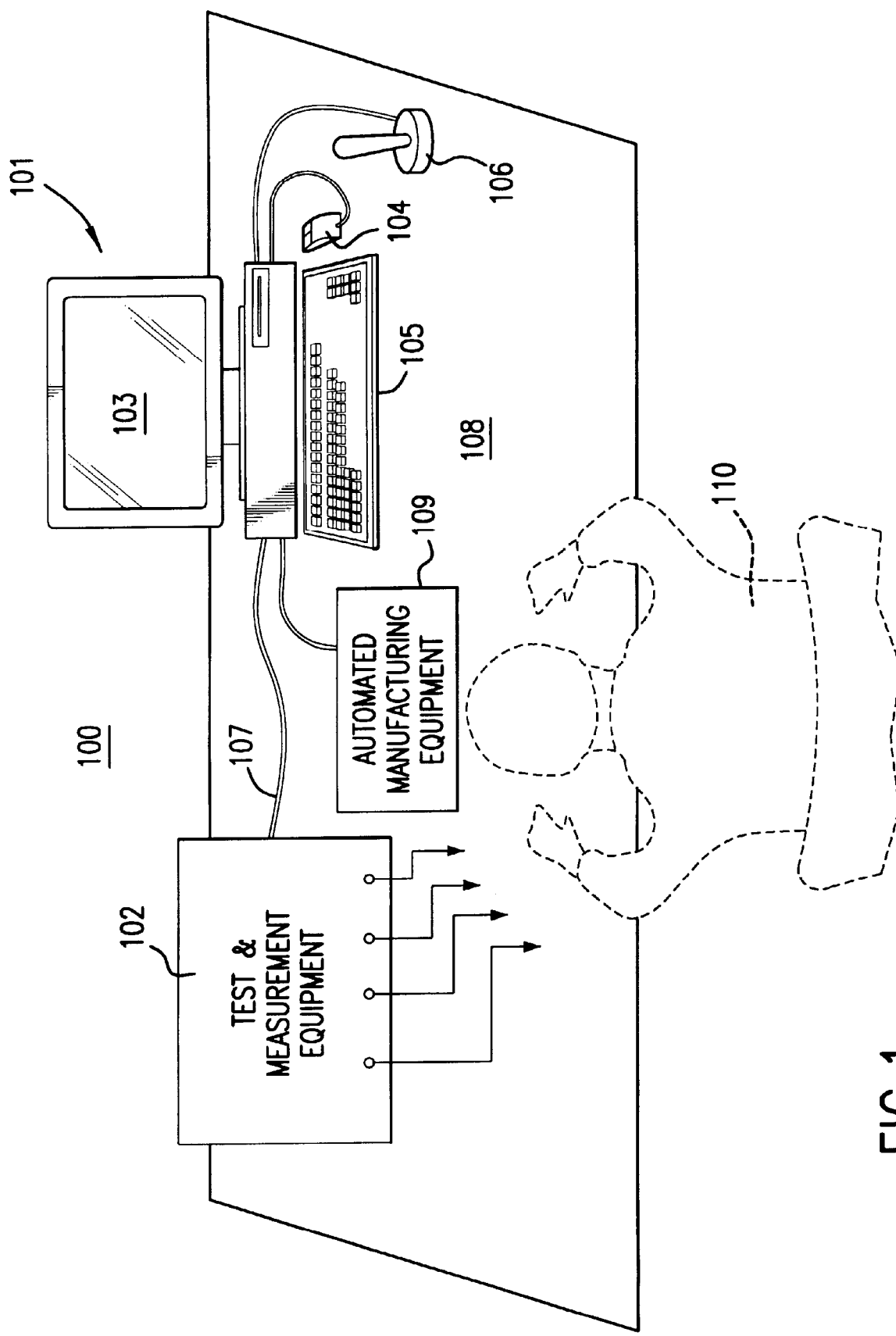
FIG. 1 is a perspective view of the workstation of the present invention.

FIG. 1 is a perspective view of the basic component parts of the workstation according to the invention. A workstation 100 generally includes a computer terminal 101 and test equipment 102. The computer 101 has a display 103 for display of various graphical user interfaces (GUI's) of the invention, as well as the usual input devices such as a mouse 104, a keyboard 105 and a bar code reader 106. In addition, cable connectors 107 provide means for interfacing the computer 101 with the test equipment 102. In addition, the workstation includes an assembly platform 108, which may include automated manufacturing equipment 109 and/or sensors and actuators for the assembly of component parts by the assembler 110. Any automated manufacturing equipment is also under control of the computer 101 via cables 107.

Figure 2:
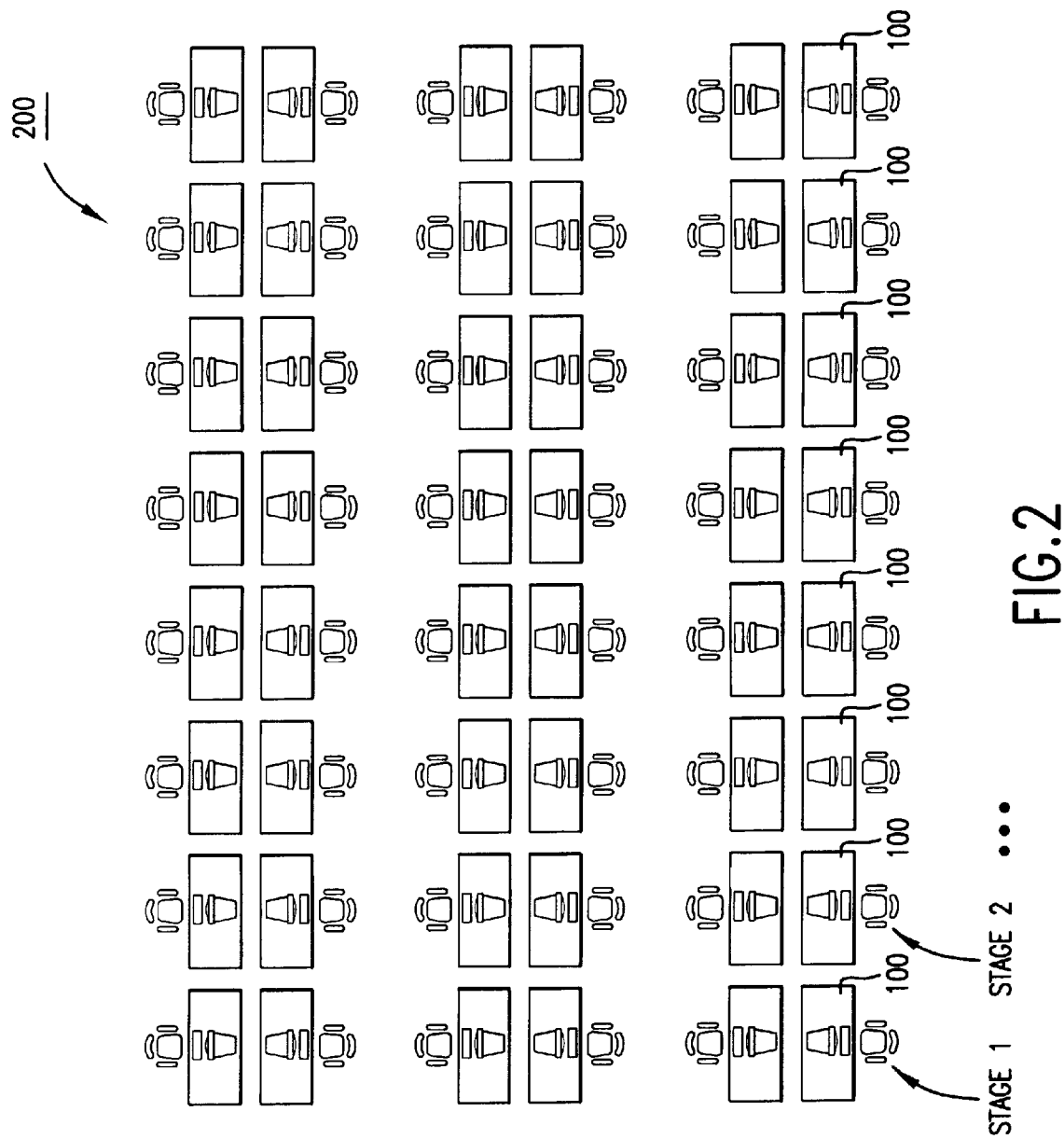
FIG. 2 illustrates the arrangement of workstations in a manufacturing facility.

Generally, as shown in FIG. 2, a plurality of workstations 100 will be arranged in multiple rows in a manufacturing facility. In most cases, a device will be assembled in stages starting at the first station 100 of a row. The device is passed down the row from station-to-station at the completion of each assembly stage. Each assembly stage will typically include multiple assembly steps and one or more test measurements. In one aspect of the invention, a unique serial number is fixed to the device or its carrier to trace its progress through the manufacturing cycle.

Each work station is characterized by the inclusion of software for interactively providing work instructions to the user and for integrating the test and measurement functions, thus providing a mechanism for forced reading by the worker and cross-checking of worker steps. The software may be resident at the workstation computer, but is preferably downloaded over an assembly plant network. Networking provides a number of advantages, including global downloading of instructional updates and ease in tracing the progress of individual assemblies.

Assume by way of example that a workstation is configured for the splicing of an optical fiber to an optical amplifier. This process stage might consist of nine process steps. A graphical user interface of the computer 101 displays each of the steps in sequence as they are completed. Further, in the case where a test and measurement function is called for upon the completion of a step, the computer 101 is programmed to setup the test, perform the test and verify that the testing has indeed been completed and that the test results are within acceptable parameters.

Figure 3A:
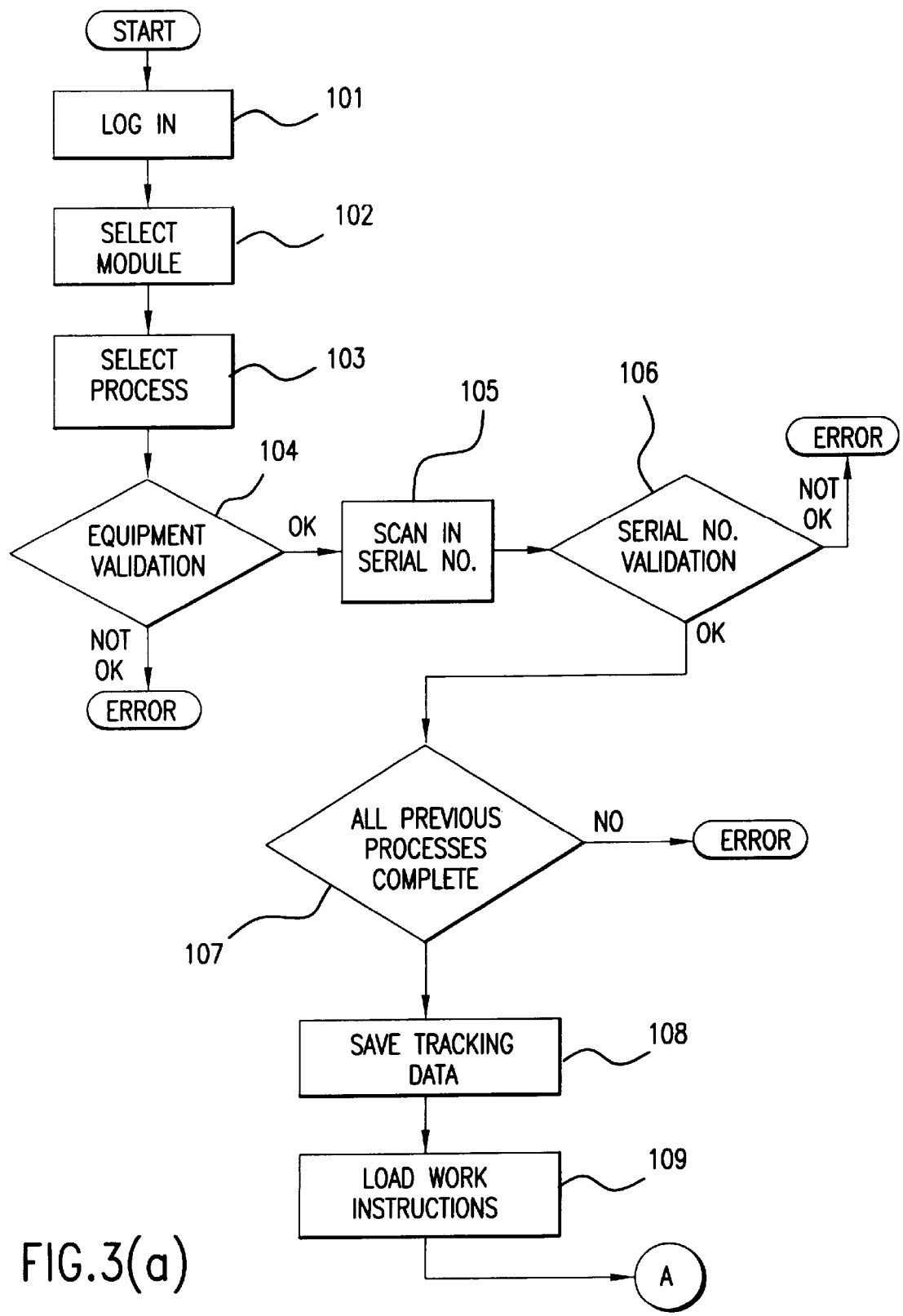
FIGS. 3(a) through 3(c) are operational flowcharts for explaining the present invention.
Figure 3B:
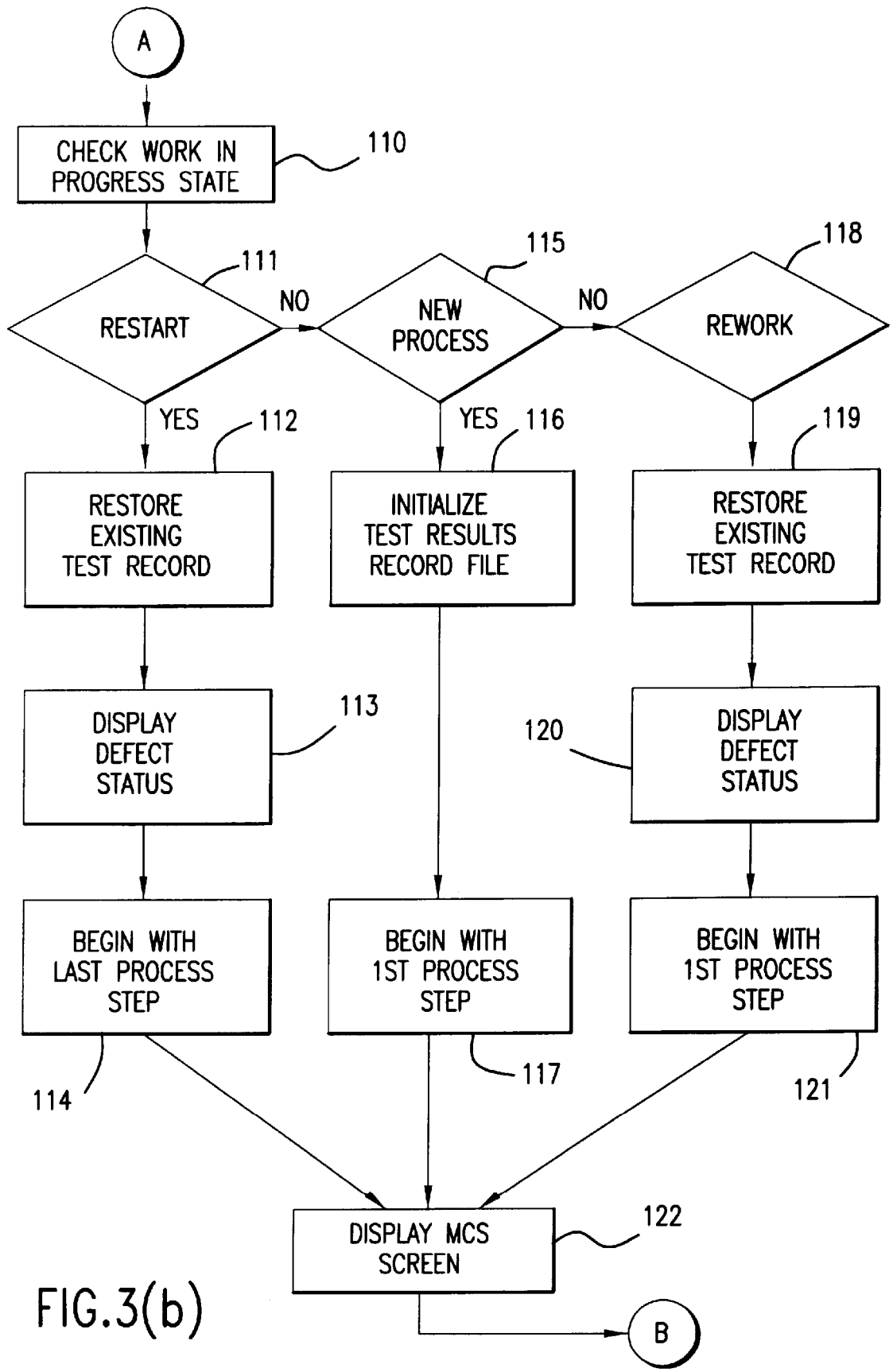
Figure 3C:
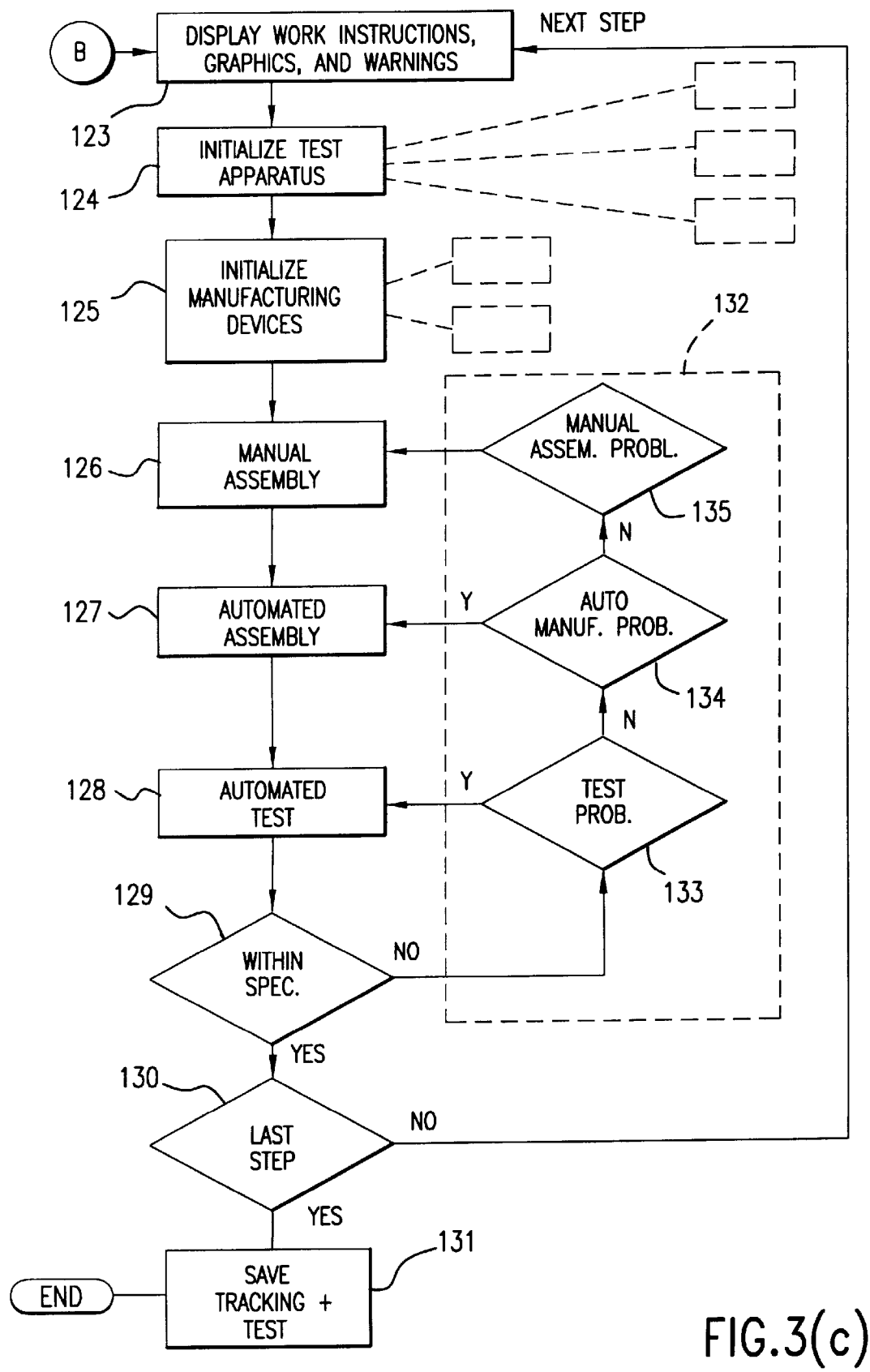

Reference is now made to FIGS. 3(*a*)–(*c*) which illustrate an example of the assembly procedure carried out by the manufacturing control station of the invention.

At the outset, the user logs into the system at Step 101, typically by entry of a user ID and password. Then, the user selects the module or product (e.g., an amplifier) being assembled at Step 102, as well as the particular process (e.g., splicing) among the plural processes needed to fully assemble the module as Step 103.

At this time, the programmed computer conducts a first validation procedure. That is, at step 104, the computer validates the appropriateness of the station equipment for the selected process. This would include validating that the user has the necessary training certification, that the station is equipped with the proper equipment and that the test and measurement devices are properly calibrated. Lack of validation results in an error message, and otherwise the process proceeds to the next step.

At Step 105, the user scans in the serial number of the assembly, the subassembly and/or the components at the workstation. This in turn triggers a second validation procedure by the programmed computer. That is, at Step 106, the serial number is validated against the selected product or module, as well as the selected process. Again, lack of validation results in the display of an error message, whereas proper validation allows the system to proceed to the next step.

Next, at Step 107, the computer makes an inquiry as to whether all previous processes (i.e., assembly stages) have been completed. This is done with reference to the product's serial number and stored tracking data associated with the product's serial number. In the event that all previous processes have not been completed, the routine issues an error message to alert the user. On the other, in the case where there is verification that all previous processes have indeed been completed, the routine proceeds to step 108 where the tracking data is stored or updated. The tracking data is used to track the progress of the product or module throughout the manufacturing cycle.

Next, at step 109, the work instructions for the selected process are loaded. These include test files, manufacturing programs, graphics and evaluation criteria. Then, at step 110, the state of any work in progress is checked. That is, depending upon the last operation performed at the station, the system will start up in one of several modes. The various initialization modes are described below and include a Restart Mode (Step 111), a New Process Mode (Step 115) and a Rework Mode (Step 118).

The Restart mode is the most common mode when the system initializes. A restart indicates that the system was shut down while work was in process. When the software is started, a special restart file is loaded at Step 112 that contains information about the last state of the software including, the last process step performed, operator ID, module type, process operation, etc. This information is used to restore the system to the last state before the machine was shut down. In addition, at step 113, the status of any defects is displayed. In this manner, the process is conditioned to take up where the assembly stage was previously terminated, i.e., to begin with the last process step completed (Step 114).

When a new assembly is entered into the database, the system checks the manufacturing control network for existing test data associated with the serial number for the assembly. If no test data exists, the system enters the New Process mode and starts at the first process step. The system also creates at Step 116 a test results record on the network that is linked to the assembly serial number. The process is thus conditioned to begin with the first process step of the assembly stage (Step 117). If the assembly is called up in the future, the system will detect the test results record and enter the Rework Mode.

As discussed above, if the system locates a test result record for the current assembly serial number, it enters the Rework Mode. At Step 119, any existing test records are restored, and at Step 120, the status of any display defects is displayed. This mode functions similar to the New Process Mode in that the system starts at the first process step (Step 121), however every test or measurement operation causes a prompt for confirmation with an "O.K. To Make The Measurement" message box to prevent accidental overwriting of existing test data.

If the system terminates abnormally, the true state of the system is unknown, so at power up the process information screen (described later) is displayed. This forces the user to verify the correct serial number of the device being worked and causes the system to enter the Rework Mode with existing test results loaded from the network.

The system is now ready to proceed with the assembly process, and at this time, a so-called MCS (manufacturing control station) screen is displayed at Step 122.

At step 123, the detailed work instructions, the accompanying graphics, and any warning messages associated with the current process step of the assembly stage are displayed. Then, at step 124, the computer initializes the test apparatus, and at Step 125, the computer initializes any automated manufacturing equipment. As shown by the dashed lines in FIG. 3, the computer may initialize multiple pieces of test equipment, as well as multiple automated manufacturing devices.

At this time, visually displayed before the assembler are detailed work instructions for carrying out the current step of the assembly stage, as well as one or more accompanying graphic images (either still images or video). In addition, any needed test equipment and automated manufacturing apparatus have been initialized.

Next, at Step 126, the assembler performs any manual assembly needed. This may include, for example, the mounting of two fibers in a splicing device. At the conclusion of such manual assembly, the assembler inputs an assembly complete command into the computer. Then, at Step 127, automated manufacturing is carried out. For example, automatic alignment of the ends of the two fibers might be performed.

After manual and automated assembly, the computer initiates and performs the automated testing functions at Step 128. The test results are fed directly to the computer from the test equipment and displayed. In the case where the test results are within control specifications at Step 129, the routine makes an inquiry at Step 130 as to whether the last step of the assembly stage has now been completed. If not, the routine returns to Step 123 to process the next step of the assembly stage. If the last step has been completed, the routine proceeds to Step 131, where the tracking and test files are all updated for use at the next assembly stage of the manufacturing cycle.

In the case at Step 129 where the test results fall outside of control specifications, the routine diverts to a trouble shooting loop 132. First, an inquiry is made at Step 133 as to whether there are any problems in the test set up, including calibration problems, improper connections, etc. If so, the problems are corrected and the automated testing is again performed at Step 128. If there are no testing problems, the automated assembly equipment is examined at Step 134 for problems. If problems are indeed discovered, then they are corrected and the routine returns to Step 127 to again perform the automated assembly and then the automated test. Finally, if no automated assembly problems are uncovered, then the manual assembly is assumed to be the cause of the poor test results, and the routine at Step 135 directs the assembler back to Step 126 to repeat the manual assembly. In this way, the assembler is automatically prevented from proceeding to the next step in the absence of test results which fall with control specifications.

To still further facilitate understanding of the present invention and the advantages obtained thereby, a description will now be given with reference to the exemplary user display screens of FIGS. 4–9.

Figure 4:
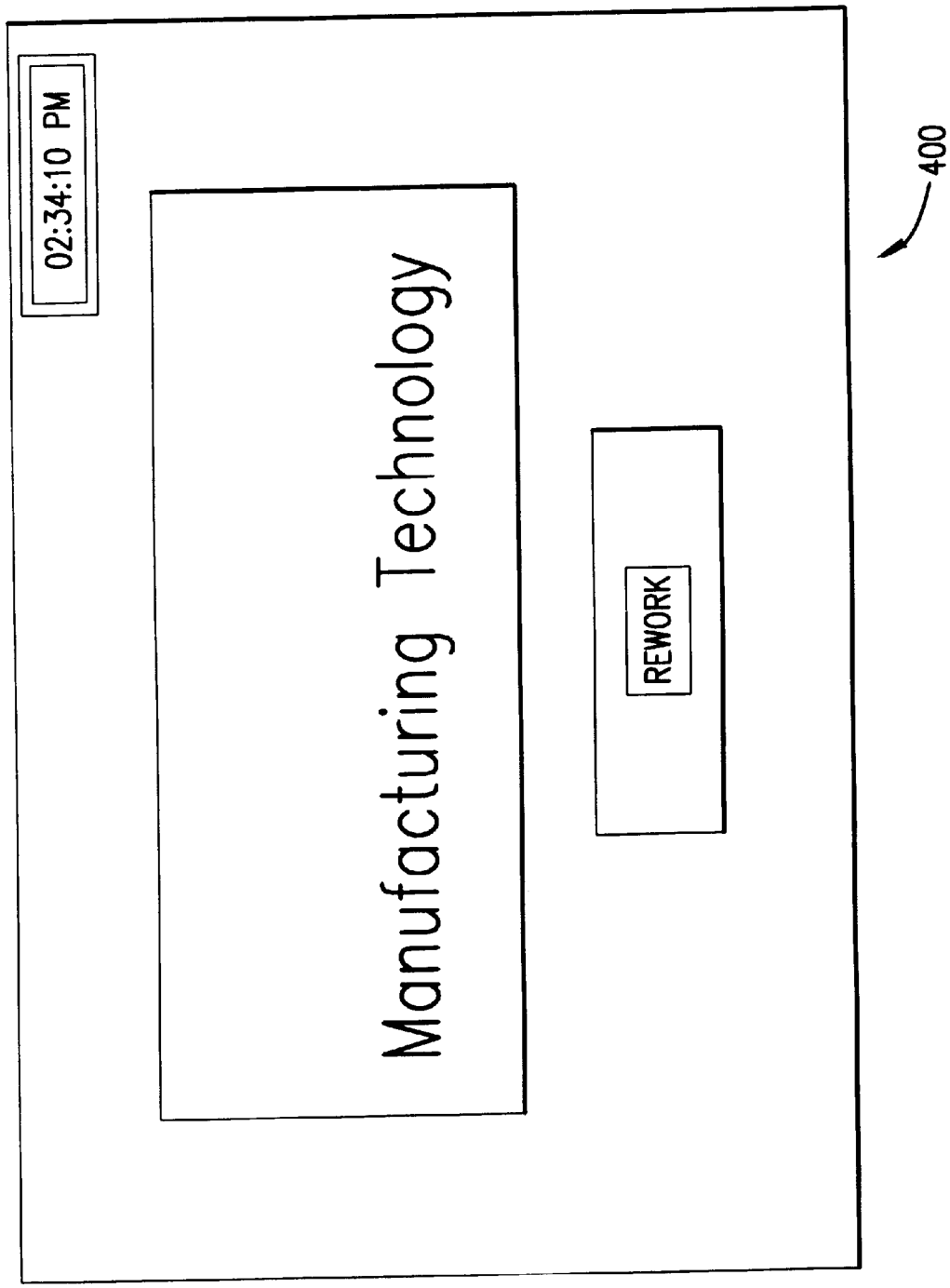
FIG. 4 is an example of a system initialization screen.

When the work station is initially powered up, the user is presented with a process information screen. After entering a valid user I.D. and password, the system automatically starts the manufacturing control system software. Depending upon the last operation performed at the station, the system will start up in one of several modes. The various initialization modes, which are described above, include a Restart Mode, a New Process Mode and a Rework Mode. FIG. 4 demonstrates the system initialization screen when initializing into the Rework Mode.

Figure 5A:
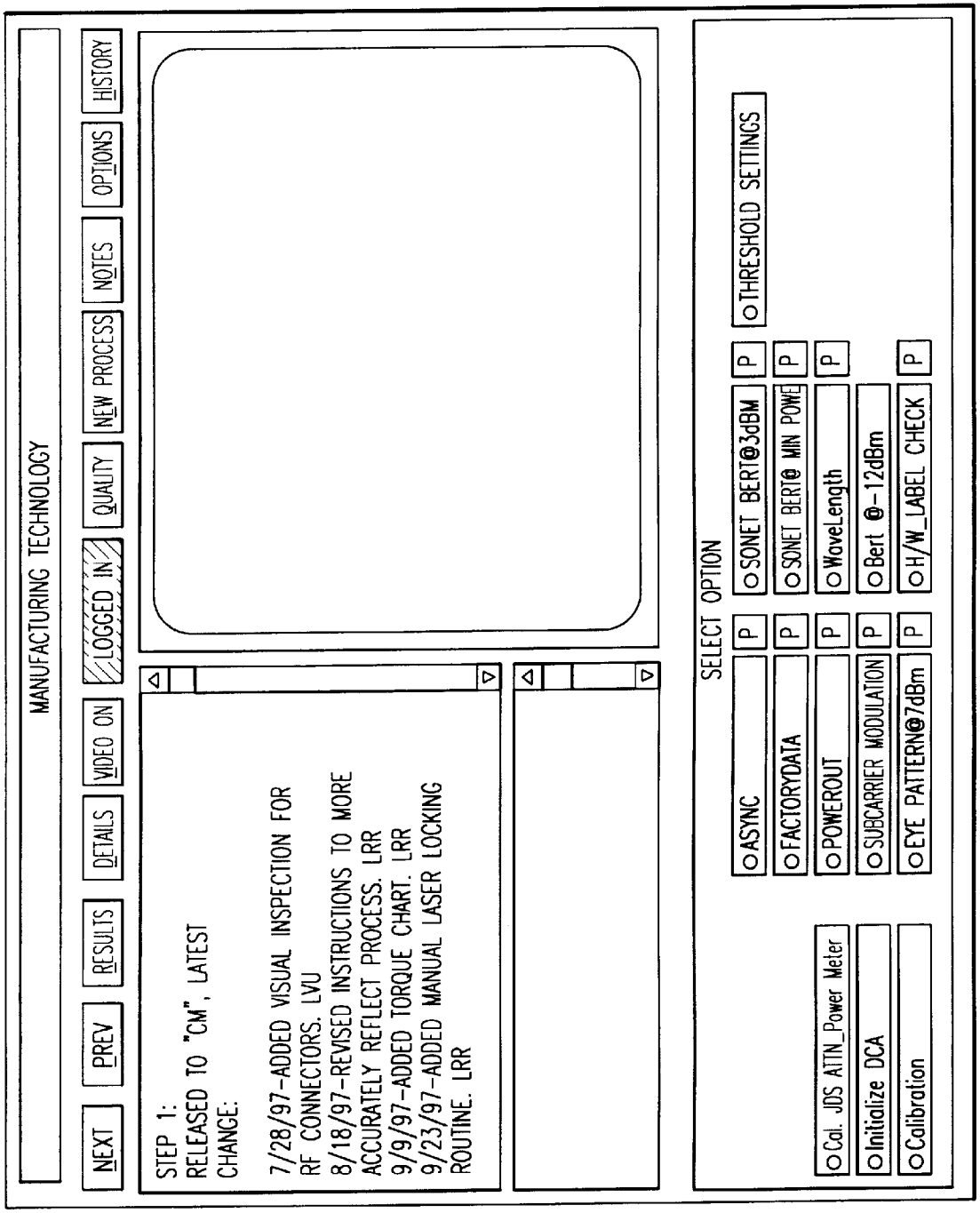
Figure 5B:

FIGS. 5(*a*)–(*c*) respectively show a manufacturing screen which may be used to link to different types of test screens. For example, any manufacturing processes that generate test results will display on the screen similar to FIG. 5(*c*). This screen is generic for all processes and allows the user to review the test results for the current device being assembled/tested. Each field consists of a gray label containing a description of the value and a white text box containing the actual value. Along the top of the screen, a manufacturing order number and the module and process, as entered in the process information screen, are displayed. Any comments that have been entered to date are also displayed. The bottom portion of the screen contains the test related data including the serial/tray number being worked, the operator I.D., and the insertion loss values for the optical components used in the assembly process. Following these values are the fields containing the results of measurements made during the assembly/test operation.

The screen of FIG. 5(*a*) will vary significantly based upon the module and process being performed. Clicking the "CLOSE" button causes the system to display the manufacturing screen.

Figure 6A:
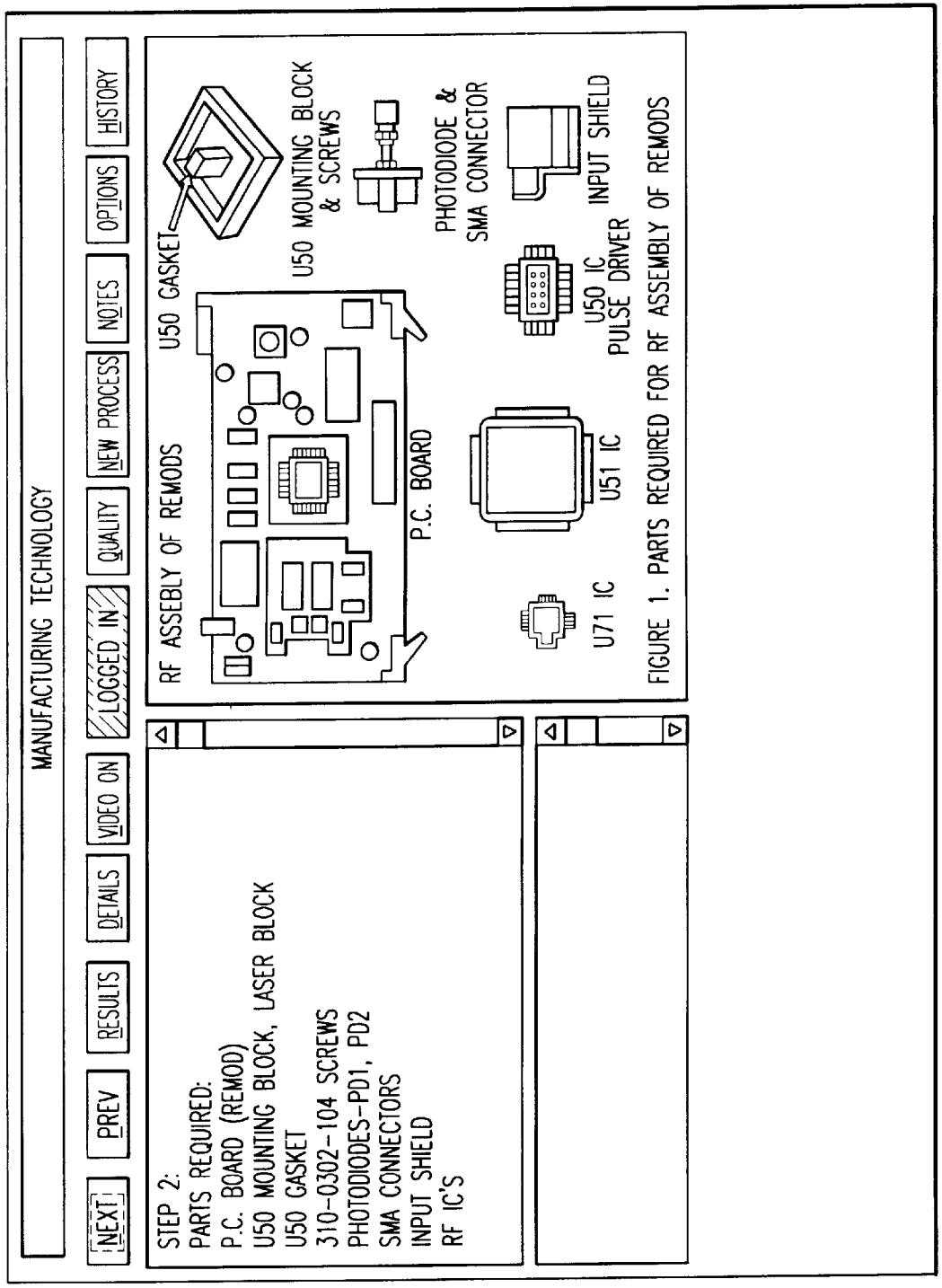
FIGS. 6(a) and 6(b) are examples of main manufacturing screens.
Figure 6B:
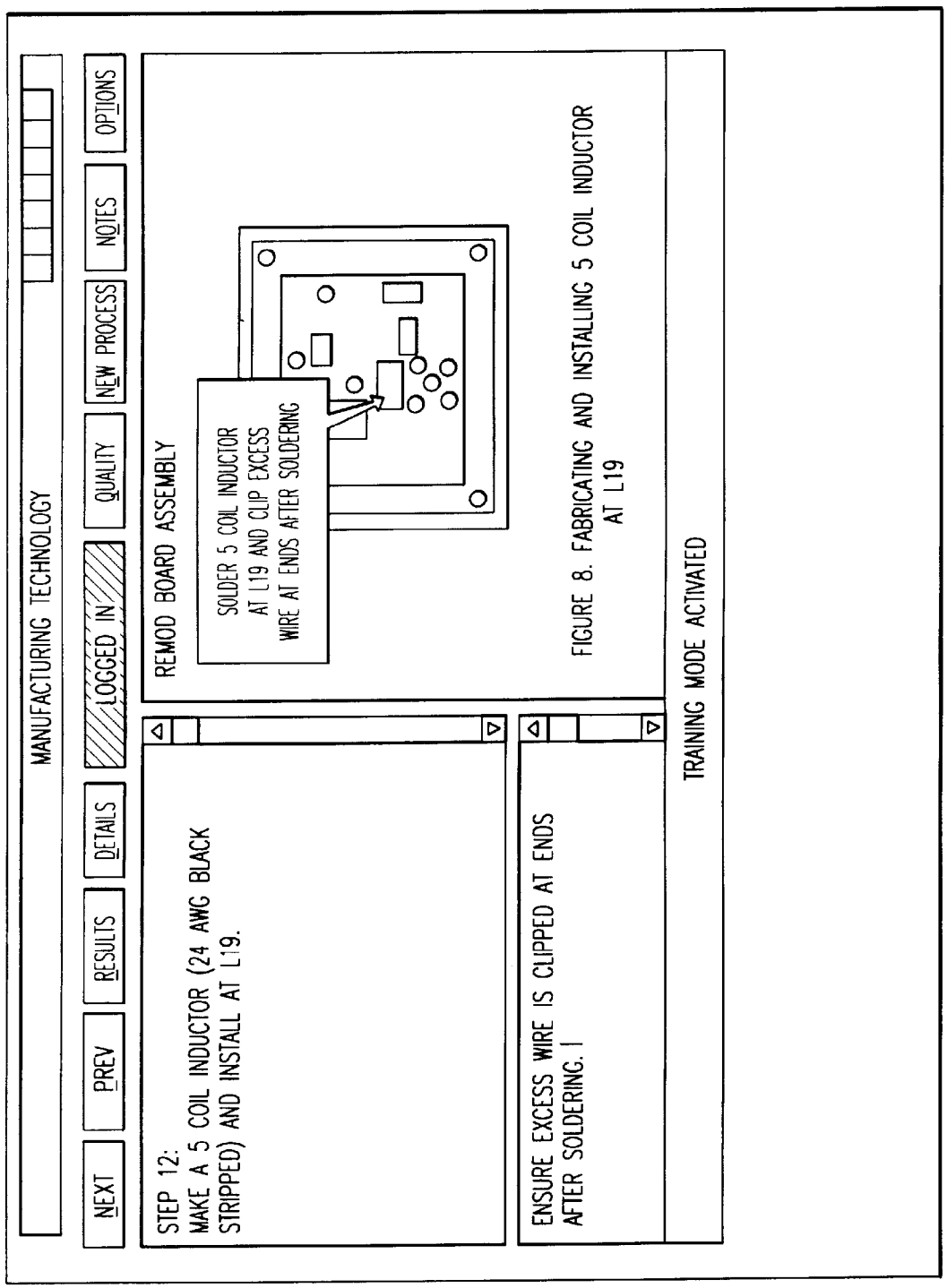
Figure 7:
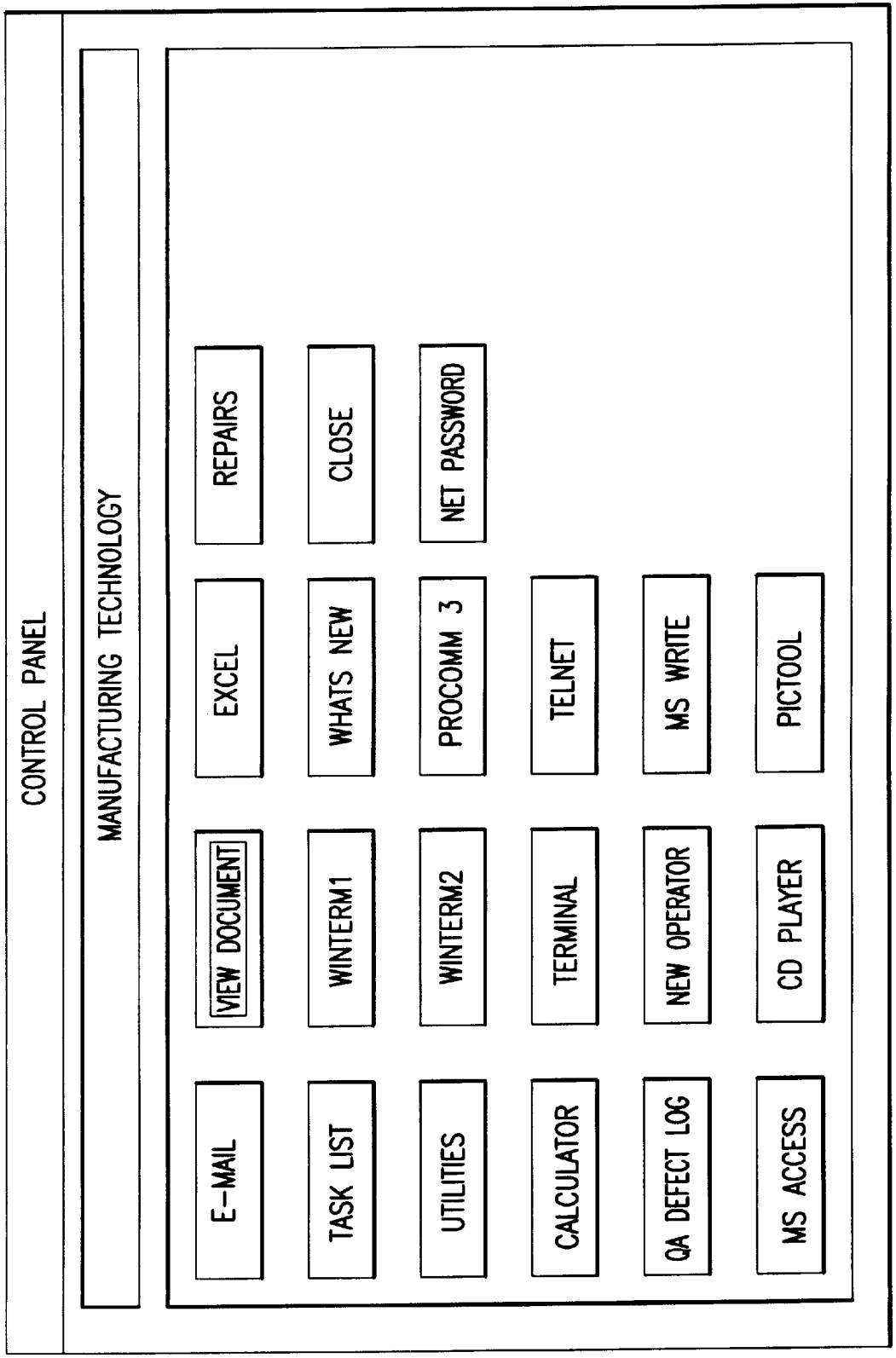
FIG. 7 is an example of an options control panel.

FIGS. 6(*a*) and 6(*b*) show representative manufacturing screens used for assembly/test processes. The left side of the screen contains a text description of the current step and if relevant, any process related warnings or notes in the text box below. As the user clicks the "NEXT" and"PREVIOUS" buttons the appropriate process information is displayed in this box. The first text information for any instruction set is the current revision level for the selected process. If all of the text does not fit in the display window, the user can scroll the text up or down by clicking the scroll bars on the right side of the text boxes.

The right side of the manufacturing screen contains a graphics window. The image can provide additional setup or assembly process details. In cases where no image is defined, a default image as shown in FIG. 6(*a*) is displayed. As the user clicks the "NEXT" and "PREVIOUS" buttons, the graphic image will change to match the appropriate process instruction.

If the software does not detect a valid connection to the manufacturing control network, the network status box in the top center of the screen will turn red and indicate that the current operator is "NOT LOGGED IN". If this occurs, the user can complete the current process. However, when the "NEW PROCESS" button is clicked, the system will automatically exit and force the user to login into the network. The user must be logged into the network to insure that the test and serial number data is properly stored before a new item or process can begin. If the network connection is valid, the box will be green and indicate that the user is "LOGGED IN" as displayed in FIG. 6.

The user selects the desired next step by clicking the buttons at the top left and right of the screen. Each button can also be selected by pressing the ALT and the underlined letter for each button. For example, pressing ALT and "N" simultaneously has the same effect as clicking the "NEXT" button.

As previously discussed, the "NEXT" and "PREV" buttons control the flow of the process by moving forward to the "NEXT" process step or backward to the "PREV" process step.

Clicking the "RESULTS" button displays the test results screen as discussed above. The user can call up the results screen at any time. Clicking the "CLOSE" button on the results screen returns the user to the manufacturing screen at the current step.

The "NEW PROCESS" button allows the user to select a new module, process, or identify a new item to work. This button causes the process information screen to be displayed along with the current processes values and item serial number information. The user can enter new information or click the "CANCEL" button to return to the current step on the manufacturing screen. Further details regarding the "NEW PROCESS" screen are provided later herein.

Clicking the "NOTES" button allows the user to enter detailed information specific to the item being worked. The user is presented with an input box and can type in whatever details are necessary. Clicking the "CLOSE" button on the text box appends the new information to the comment field and returns to the manufacturing screen. If the user clicks the "RESULTS" button, the new text can be read in the "COMMENTS" field.

Clicking the "OPTIONS" button causes a control panel to be displayed with a variety of additional functions the user can select. A representative Control Panel is displayed in FIG. 7 and a brief description of each option is described next.

The "VIEW DOCUMENT" button starts a program that allows the user to view engineering change notices (ECN's) and other image based document files. The "BILL OF MATERIAL" button starts a database program the allows the user to view the bill of material for a selected part number. The "TERMINAL" button starts a communications program that allows the user to communicate with an external device using the communications port of the computer. The "NEW OPERATOR" button terminates the current processes, logs the user out of the network, and initiates a new login sequence. The "CD PLAYER" button allows the user to listen to audio disks using the computer CD player. The "E-MAIL" button starts E-MAIL software. The "TASK LIST" button displays the Windows Task Display for the user to select or terminate a specific program. The "UTILITIES" button prompts for a password and if a correct password is entered, displays the utilities menu. The "CALCULATOR" button starts the Windows calculator program. The "CLOSE" button closes the Control Panel and returns to the manufacturing screen.

FIG. 8 shows a representative process information screen. The module field is a combo box that allows the user to select the specific module to be worked. Based upon the selected operation, the user will be presented with a choice of assembly/test options related to the module. Based upon the selected operation, a group of serial number fields will be presented in an area of the screen. The user will scan in the bar coded part number and serial number in the respective fields. On the bottom of the screen are several control buttons that allow the user to control the access and updating of the data entered on the screen.

The "GET DATA" button allows the user to access the manufacturing control network databases to retrieve serial number information about the current item. For example, the user can enter the module serial number (MODULE SN field) and click the "GET DATA" button. The software will search the network tables for a record that contains the requested serial number. If a record is located, the software will read the data in the record and load the respective fields on the process information screen with part and serial numbers. In addition, the MO Number and Operator I.D. field data will be filled in with the values from the network record.

The "SAVE DATA" button allows the user to update the manufacturing control network databases with serial number information about the current item. When the user clicks the "SAVE DATA" button, the software first performs a Get Data (described above) operation to check the network for existing information. If a matching network record is located, the fields on the process information screen are overwritten with the existing values from the network database to avoid destroying existing information about the item. If the user changes the associated serial number values and clicks "SAVE DATA" again, the software will preserve the original field value from the network and assign the new values as the current serial numbers. This will preserve old information when changes are made to the item such as replacement of a serialized component.

The "CLEAR FIELDS" button erases the contents of all part and serial number fields on the process information screen. This button can be clicked when starting a new item.

The "CLOSE" button informs the software that the user has finished entering information and wishes to begin assembly/test of the current item. If un-saved changes exist, the system will prompt the user to save the data. The software will download several databases that define the appropriate setup for the selected module and operation and create a new test result record. After the data is initialized, the software will load the manufacturing screen and display the revision level for the selected instruction set.

The "CANCEL" button informs the software that the user wishes to exit the process information screen and return to the current step. This button causes the previous data to be restored on the screen and the last process instructions to be displayed on the manufacturing screen.

The process information screen is use to define and save relationships of serialized components that are installed into a next-higher-assembly. For example, assume an amplifier cassette serial number contains 3 serialized components, of which, two have been recorded. When the "SAVE DATA" button is clicked the software will associate an isolator and an a tap A6 with the next-higher-assembly cassette. The serial number for the 980 WDM could be added at a later time by entering the cassette serial number and clicking the "GET DATA" button to retrieve the existing data. Then the 980 part and-serial number can be entered and the "SAVE DATA" button clicked to record the change.

Since the data is hierarchical, the cassette serial number can be recorded as a component for a module. The software will search for all "sub-records" (i.e. the cassette contents) if the user enters the module serial number at a subsequent process operation. This will insure that any significant data associated with a module or any sub-assemblies are displayed on the process information screen when the user clicks the "GET DATA" button.

Figure 9:
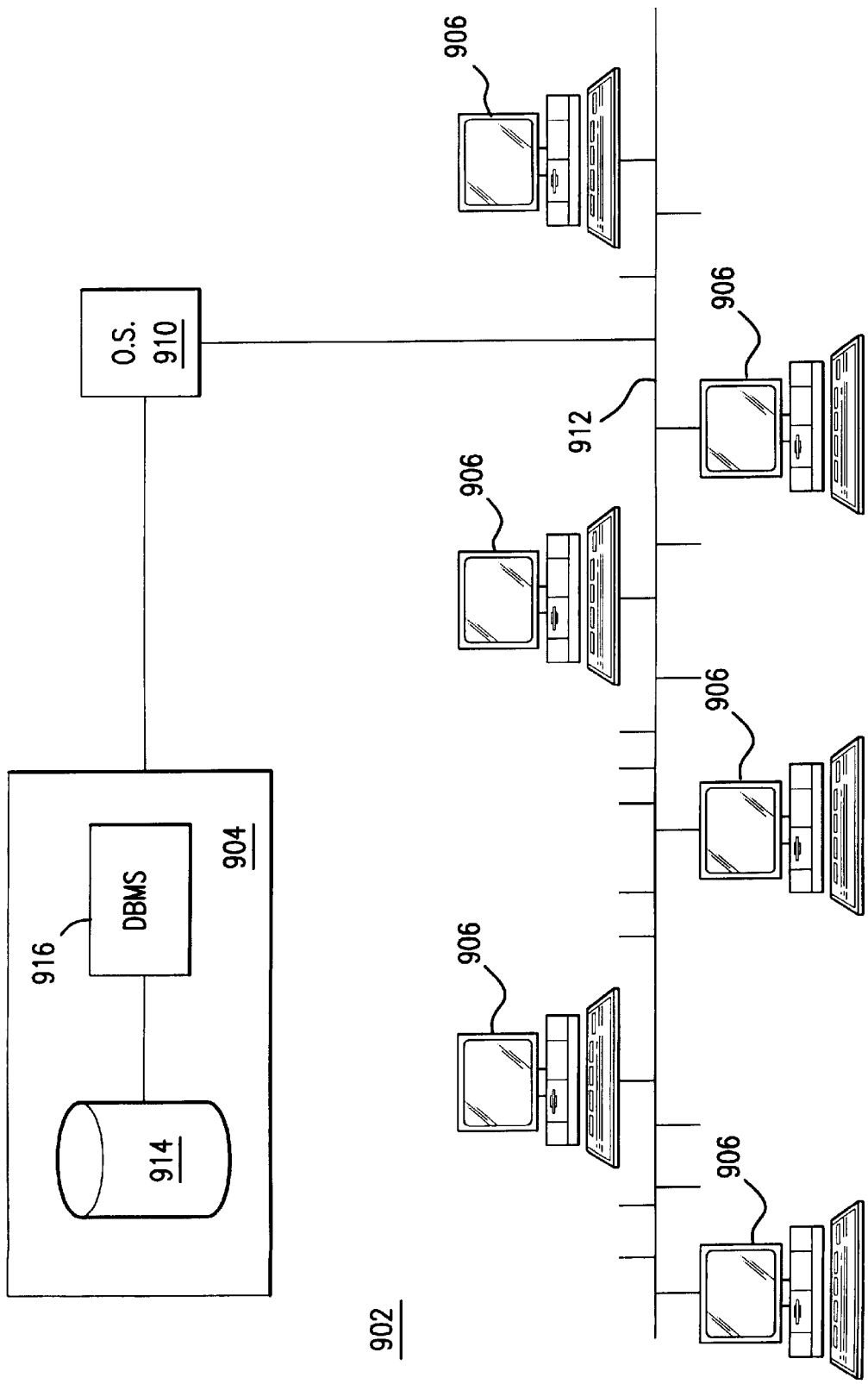
FIG. 9 is a diagram for describing a communications network which may be employed according to the present invention.

FIG. 9 is a diagram for describing a communications network which may be employed according to the present invention. A local area network (LAN) 902 serves users (i.e. workstations), typically within the confined geographic area of an assembly plant. That is, the LAN 902 is made up of a server 904, the workstations 906 (which have been described in detail above), a database server 1008, a network operating system 1010, and a communications link 1012.

The network operation system 910 is the controlling software in the LAN 902, such as the well-known NetWare or UNIX operating systems, and a component part of this software resides in the workstations 906. The operating system 910 allows the application program running in each workstation 906 to read and write data from the server 908 as if it were resident in at the workstation 906. The communications link 912 is implemented by cable, such as fiber, coax or twisted pair, and physically interconnects the server 904 and workstations 906 via network adapters (not shown).

It is noted that multiple types of LAN configurations and transport protocols may be used to implement the present invention and are well known in the art.

The database server 904 includes the database management system DBMS 914 and the database 916. The DBMS 914 accepts requests from the application programs (which may be resident at the server 904 or the workstations 906), and instructs the operating system 910 to transfer requested data to and from the application programs. The DBMS 914 also controls at least the organization, storage and retrieval of the data stored in the database 916.

A salient feature of the invention resides in the data structure in which the work instructions and related information are stored in the database 916. In particular, the invention is preferably a relational data base driven system providing process flexibility. The data structure allows for the alteration and/or addition of products, serial numbers and process step, as well as the work instructions, test files and automated manufacturing steps associated with each product, serial number and work instruction, without having to rewrite or alter the underlying code of the manufacturing control station. In other words, the operational code functions independently of the content presented to the user in the form of graphical interfaces and applied to the work station, as well as independently of the content of the automated tests and manufacturing functions.

Figure 10:
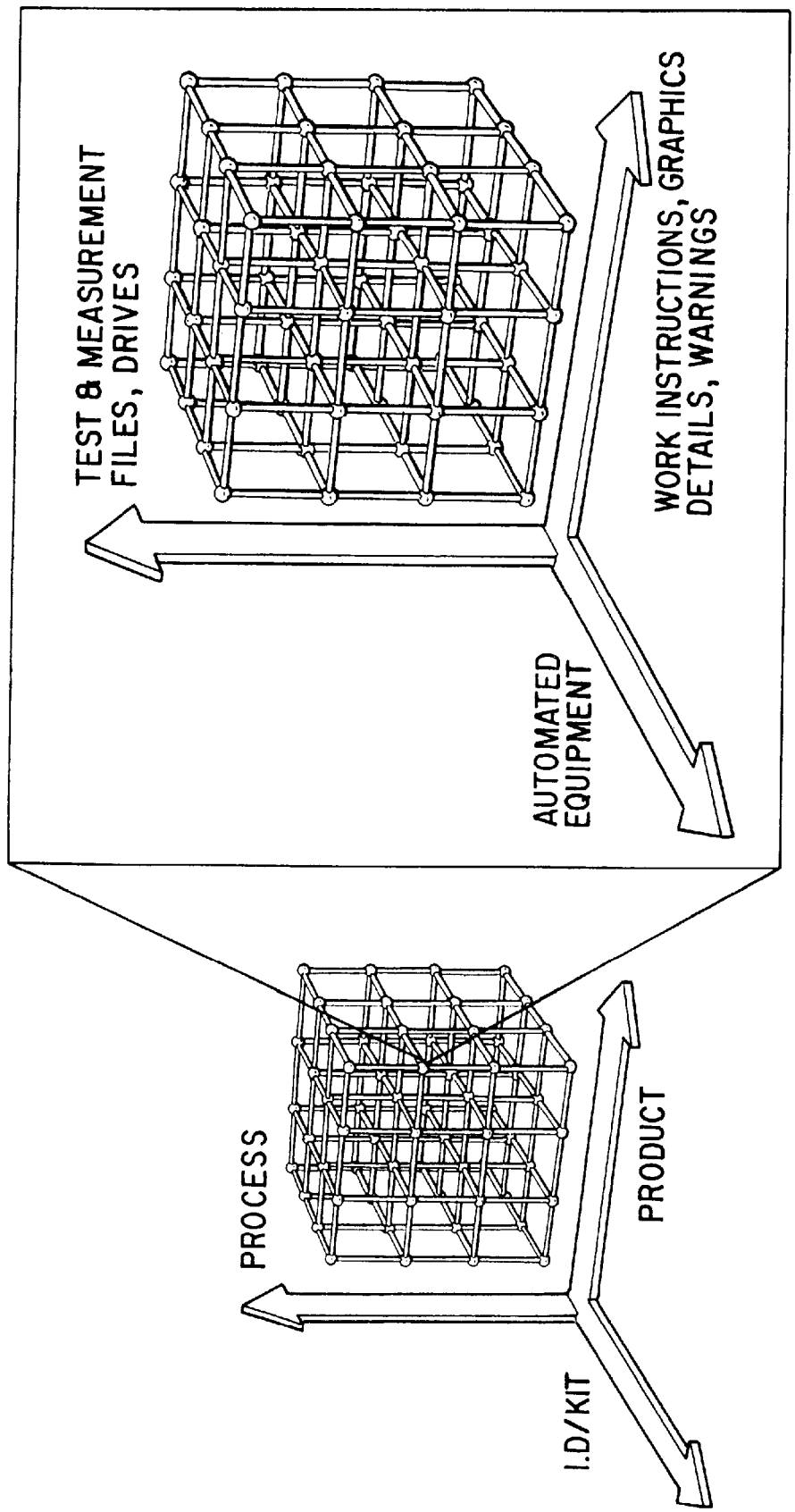
FIG. 10 illustrates the relationship between tracking and action tables for storing data according to the present invention.

This aspect of the invention is explained further with reference to FIG. 10. The upper cube is representative of a three-dimension tracking table of the database 914. The table is said to have three dimensions in that there are three related pieces of information stored therein in table form. In particular, the tracking table identifies the type of product (e.g., amplifier), the serial number of the product, and the process steps associated with the product. To retrieve a given process step for the workstation, the input selected product and process, as well as the scanned in serial number, are used to link to the selection of action items contained in an action table of the database 914. The action table, which also may also be represented as a three-dimensional table, is shown as the bottom cube in FIG. 10 and contains works instructions, graphics, video and other media, test files, and automated manufacturing files. The underlying code of the manufacturing control station of the invention is essentially driven by the data retrieved from the tracking and action tables. Thus, the contents of the tables may be freely updated without reworking the program code itself. For example, graphics may be changed or work instructions updated by changing the table contents, without any additional programming effort.

The manufacturing control system may use time stamped action and tracking tables for use in selectively pulling data for any networked workstation. That is, an additional pointer may be used that is locked to the date for every entry in the tracking and action tables. This allows the most recent data to be extracted in execution of the assembly processes.

The communications system described above allows for any workstation within the manufacturing control system to be configured for the new, reworked or restarted optoelectronic assemblies. Also, the system controls data traffic for the multiple networked workstations so that reconfiguration of any one work station for a modified or new process is feasible from both the workstation or a remote location.

Although preferred embodiments of the present invention have been described in detail hereinabove, it should be clearly understood that many variations and/or modifications of the basic inventive concepts herein taught, which may appear to those skilled in the art, will still fall within the spirit and scope of the present invention as defined by the appended claims and their equivalents.

Having thus described our invention, what we claim as new and desire to secure by Letters Patent is as follows:

1. A communications system comprising:
    a plurality of workstations each including (a) a computer terminal having a display and at least one input device, (b) test apparatus operatively coupled to said computer terminal and to a workpiece for performing at least one test measurement of the workpiece, and (c) an assembly application program which generates a first display of an assembly procedure to be followed by an assembler on said display of said computer terminal and a second display for display of the at least one test measurement obtained by said test apparatus or a result of the at least one test measurement on said display of said computer terminal; and
    a relational database operatively connected to said workstations via a communications link, said relational database storing data which is independent of the assembly program and which is indicative of the assembly procedure used by the assembly application program and the test measurement of the workpiece.

2. A communications system as claimed in claim 1, wherein a data structure of said relational database includes a tracking table and an action table, the tracking table being used to link to data contained in the action table, wherein the tracking table identifies a type of workpiece, a serial number of the workpiece, and at least one process step associated with the workpiece, and wherein the action table identifies at least one instruction, test file and automated manufacturing file.

3. A communications system as claimed in claim 1, wherein said workstations are each capable of executing new, reworked and restarted assembly of optoelectronic assemblies.

4. A communications system as claimed in claim 1, reconfiguration of any one workstation for a modified or new assembly process can be executed from both the workstation or a remote location.

5. A communications system as claimed in claim 1, wherein the action and tracking tables are date stamped, and wherein a pointer is locked to a date for every entry in the tracking and action for use in selectively extracting data for any workstation.

6. A communications system as claimed in claim 1,
    said assembly application program interacting with said test apparatus to setup the at least one test measurement, perform the at least one test measurement and verify that the at least one test measurement is within tolerance parameters.

7. A communications system as claimed in claim 6,
    said assembly application program entering a trouble shooting mode when the at least one test measurement is outside tolerance parameters.

8. A communications system as claimed in claim 1, wherein the assembler utilizes said input device to input a workpiece identification and to select an assembly process or test measurement,
    said assembly application program validating an appropriateness of said workstation performing the selected assembly process or test measurement on the identified workpiece.

9. A communications system as claimed in claim 8, wherein the assembler utilizes said input device to input his or her identity, said assembly application program validating an appropriateness of the identified assembler to perform the selected assembly process or test measurement.

10. A communications system as claimed in claim 8, said assembly application program validating whether said test apparatus is properly calibrated.

11. A communications system as claimed in claim 8, said assembly application program verifying that at least one previous assembly process has been completed.

12. A communications system as claimed in claim 8, wherein when said workstation executes a reworked or restarted assembly, said assembly application program restores an existing test record from said relational database.

13. A communications system as claimed in claim 1, said assembly application program prohibiting initiation of a new assembly process upon detecting that said relational database is not operatively connected to a corresponding one of said workstations.

14. A manufacturing and testing communications method, comprising:

providing at least one work instruction to an assembler working at a workstation to assemble a workpiece by generating a first display of an assembly procedure to be followed by the assembler on a display screen of the workstation;

controlling a test apparatus to perform at least one test measurement of the workpiece;

generating a second display of the at least one test measurement obtained by said test apparatus and/or a result of the least one test measurement on the display screen; and storing data in a relational database which is indicative of the assembly procedure used and which includes the at least one test measurement and/or result thereof.

15. A method as claimed in claim 14, further comprising:

performing a plurality of assembly procedures; and integrating test measurements of the workpiece from each of the assembly procedures with the relational database.

16. A method as claimed in claim 14, further comprising:

setting up the at least one test measurement;

performing the at least one test measurement; and verifying that the at least one test measurement is within tolerance parameters.

17. A method as claimed in claim 14, further comprising:

inputting a workpiece identification;

selecting an assembly process or test measurement; and validating an appropriateness of the workstation to performing the selected assembly process or test measurement on the identified workpiece.

18. A method as claimed in claim 17, further comprising:

inputting an identity of the assembler; and validating an appropriateness of the identified assembler performing the selected assembly process or test measurement.

19. A method as claimed in claim 17, further comprising:

restoring an existing test record from the relational database when executing a reworked or restarted assembly process.

20. A method as claimed in claim 17, further comprising:

prohibiting initiation of a new assembly process upon detecting that the relational database is not operatively connected to a corresponding one of the workstations.

21. The method as claimed in claim 14, further comprising:

creating a data structure in the relational database that includes a tracking table and an action table; and linking data contained in the action table by using the tracking table.

22. The method as claimed in claim 21, wherein the tracking table identifies a type of product, a serial number of the product, and at least one process step associated with the product, wherein the action table identifies instructions, test files and automated manufacturing files.

* * * * *